(12) United States Patent
Watanabe

(10) Patent No.: US 6,453,082 B1
(45) Date of Patent: Sep. 17, 2002

(54) DEVICE AND SYSTEM FOR WAVEFORM SHAPING

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/665,164

(22) Filed: Sep. 19, 2000

(30) Foreign Application Priority Data

Oct. 15, 1999 (JP) .............................. 11-293189

(51) Int. Cl.[7] .................................. G02B 6/26
(52) U.S. Cl. ............................. 385/15; 385/24; 385/27
(58) Field of Search ............................. 385/15, 27, 24, 385/11, 122; 372/6, 21, 22; 359/124, 158, 332

(56) References Cited

U.S. PATENT DOCUMENTS

| 5,533,154 A | * | 7/1996 | Smith | 385/27 |
| 5,848,205 A | * | 12/1998 | Bigo | 385/15 |
| 5,903,384 A | * | 5/1999 | Bulow | 359/332 |

* cited by examiner

Primary Examiner—Phan T. H. Palmer
(74) Attorney, Agent, or Firm—Staas & Halsey LLP

(57) ABSTRACT

The present invention relates to a device and system for waveform shaping. The device includes at least two nonlinear loop mirrors (NOLM1 and NOLM2). Each of the NOLM1 and the NOLM2 includes a first optical coupler including first and second optical paths and directionally coupled to each other, a loop optical path formed of a nonlinear optical medium for connecting the first and second optical paths, and a second optical coupler including a third optical path directionally coupled to the loop optical path. The second optical path of the NOLM1 is optically connected to the third optical path of the NOLM2.

23 Claims, 11 Drawing Sheets

DEVICE AND SYSTEM FOR WAVEFORM SHAPING

BACKGROUND OF THE INVENTION

1. Field of the Invention

The present invention relates to a device and system for waveform shaping.

2. Description of the Related Art

A Mach-Zehnder interferometer (MZI) type optical gate is known as a conventional waveform shaping device for performing waveform shaping on the optical level. This optical gate is configured by integrating a Mach-Zehnder interferometer including first and second nonlinear optical media each for providing a phase shift on an optical waveguide substrate, for example. Probe light as continuous wave (CW) light is equally divided into two components, which are in turn supplied to the first and second nonlinear optical media. The optical path length of the interferometer is set so that output light is not obtained by interference of the two components of the probe light.

An optical signal is further supplied to one of the first and second nonlinear optical media. By properly setting the powers of the optical signal and the probe light, a converted optical signal synchronous with the optical signal is output from the optical gate. The converted optical signal has the same wavelength as that of the probe light.

It has been proposed to use a semiconductor optical amplifier (SOA) as each of the first and second nonlinear optical media. For example, an InGaAs-SOA having opposite end faces treated with antireflection coatings is used as each nonlinear optical medium in a 1.5 $\mu$m band, and these nonlinear optical media are integrated on an InP/GaInAsP substrate to fabricate an optical gate.

A nonlinear optical loop mirror (NOLM) is known as another conventional waveform shaping device. The NOLM includes a first optical coupler including first and second optical paths directionally coupled to each other, a loop optical path for connecting the first and second optical paths, and a second optical coupler including a third optical path directionally coupled to the loop optical path.

By forming a part or the whole of the loop optical path from a nonlinear optical medium and supplying probe light and an optical signal respectively to the first optical path and the third optical path, a converted optical signal is output from the second optical path.

An optical fiber is generally used as the nonlinear optical medium in the NOLM. In particular, a NOLM using a SOA as the nonlinear optical medium is referred to as an SLA-LOM (Semiconductor Laser Amplifier in a Loop Mirror).

In each conventional waveform shaping device mentioned above, the converted optical signal is generated by a nonlinear effect based on the optical signal and the probe light supplied. However, since there is a limit that the wavelength of the converted optical signal generated is the same as the wavelength of the probe light supplied, the degree of freedom of wavelength conversion is small in the case of performing waveform shaping or obtaining an optical gate function.

This application relates to U.S. application Ser. Nos. 09/217,018, 09/560,723 and 09/571,384, and which are incorporated herein by reference.

SUMMARY OF THE INVENTION

It is therefore an object of the present invention to provide a device for waveform shaping which can increase the degree of freedom of wavelength conversion.

It is another object of the present invention to provide a novel system including such a device. Other objects of the present invention will become apparent from the following description.

In accordance with a first aspect of the present invention, there is provided a device comprising first and second nonlinear loop mirrors. Each of the first and second nonlinear loop mirrors comprises a first optical coupler including first and second optical paths directionally coupled to each other, a loop optical path formed of a nonlinear optical medium for connecting the first and second optical paths, and a second optical coupler including a third optical path directionally coupled to the loop optical path. The second optical path of the first nonlinear loop mirror is optically connected to the third optical path of the second nonlinear loop mirror.

This device operates in the following manner, for example. First probe light having a first wavelength is supplied to the first optical path of the first nonlinear loop mirror. An input optical signal having a second wavelength different from the first wavelength is supplied to the third optical path of the first nonlinear loop mirror. An intermediate optical signal having the first wavelength and synchronous with the input optical signal is supplied from the second optical path of the first nonlinear loop mirror to the third optical path of the second nonlinear loop mirror. Second probe light having a third wavelength different from the first wavelength is supplied to the first optical path of the second nonlinear loop mirror. As a result, an output optical signal having the third wavelength and synchronous with the intermediate optical signal (i.e., the input optical signal) is output from the second optical path of the second nonlinear loop mirror.

The sign of the difference between the first wavelength and the second wavelength may be made equal to the sign of the difference between the third wavelength and the first wavelength. In this case, it is possible to increase a wavelength difference between the input optical signal supplied to the first nonlinear loop mirror and the output optical signal output from the second nonlinear loop mirror.

Further, the third wavelength may be made substantially equal to the second wavelength. In this case, it is possible to perform the conversion from the optical signal supplied to the first nonlinear loop mirror to the optical signal output from the second nonlinear loop mirror without the generation of a wavelength difference between these optical signals.

Thus according to the present invention, it is possible to provide a device for waveform shaping which can increase the degree of freedom of wavelength conversion. Furthermore, it is also possible to obtain an additional effect such that more effective waveform shaping can be performed over the prior art in accordance with the principle to be hereinafter described.

At least one of the first and second probe lights may comprise clock pulses. In this case, retiming on the optical level according to the clock pulses is allowed.

In accordance with a second aspect of the present invention, there is provided a device comprising N (N is an integer greater than 2) nonlinear loop mirrors cascaded. Each of the nonlinear loop mirrors, comprises a first optical coupler including first and second optical paths directionally coupled to each other, a loop optical path formed of a nonlinear optical medium for connecting the first and second optical paths, and a second optical coupler including a third optical path directionally coupled to the loop optical path.

The second optical path of the i-th (i is an integer satisfying 1≦i≦(N−1)) nonlinear loop mirror is optically connected to the third optical path of the (i+1)-th nonlinear loop mirror.

In accordance with a third aspect of the present invention, there is provided a system comprising a waveform shaping device provided by the device in accordance with the first aspect of the present invention, first and second probe light sources, and a first optical fiber transmission line. The first probe light source supplies first probe light having a first wavelength to the first optical path of the first nonlinear loop mirror. The first optical fiber transmission line supplies an input optical signal having a second wavelength different from the first wavelength to the third optical path of the first nonlinear loop mirror. The second probe light source supplies second probe light having a third wavelength different from the first wavelength to the first optical path of the second nonlinear loop mirror.

With this configuration, the waveform shaping in accordance with the present invention can be performed in an optical receiver provided at an output end of the first optical fiber transmission line.

This system may further comprise a second optical fiber transmission line optically connected to the second optical path of the second nonlinear loop mirror for transmitting the output optical signal. In this case, the waveform shaping in accordance with the present invention can be performed in an optical repeater provided between an output end of the first optical fiber transmission line and an input end of the second optical fiber transmission line.

In accordance with a fourth aspect of the present invention, there is provided a device comprising an optical branch for branching input signal light into first and second input signal lights, a clock regenerator for generating clock pulses according to the first input signal light, and a waveform shaping device for performing waveform shaping according to the second input signal light and the clock pulses. The waveform shaping device may be provided by the device according to the present invention.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
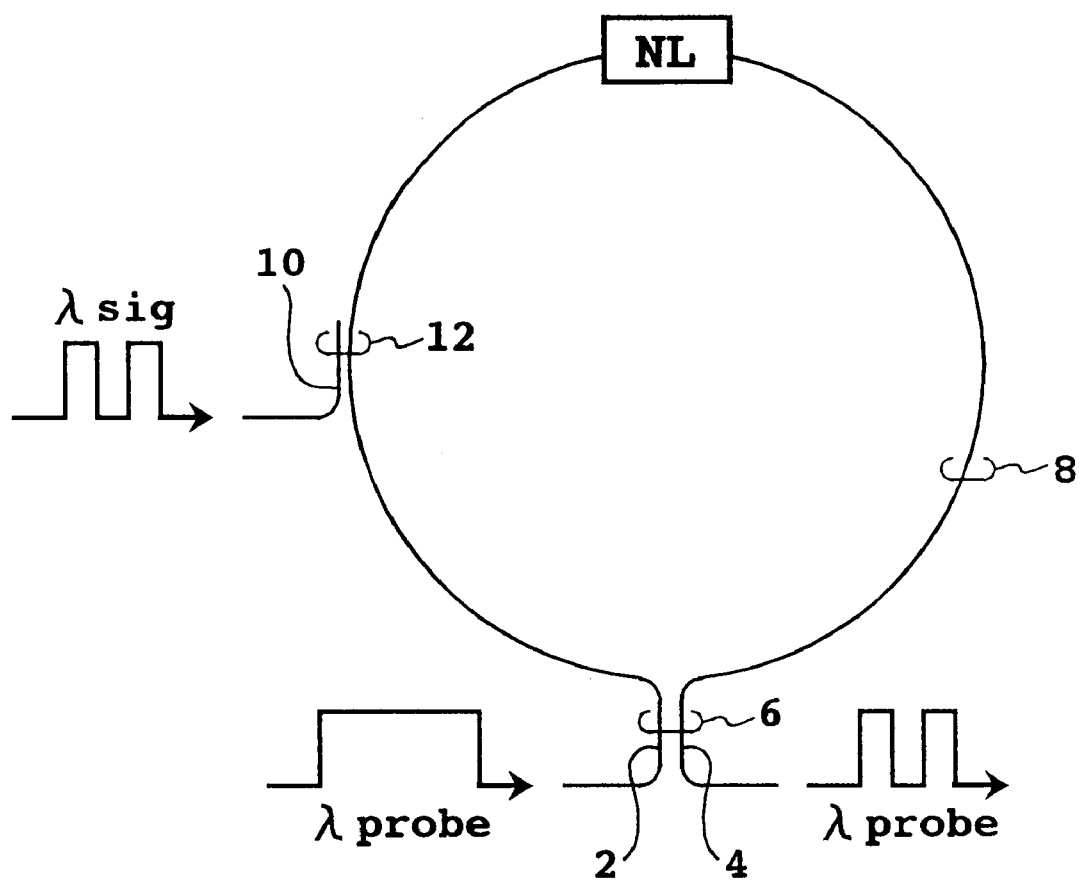
FIG. 1 is a diagram showing a configuration of a NOLM (nonlinear optical loop mirror) applicable to the present invention.

Referring to FIG. 1, there is shown a configuration of an NOLM (nonlinear optical loop mirror) applicable to the present invention. This NOLM includes a first optical coupler 6 including first and second optical paths 2 and 4 directionally coupled to each other, a loop optical path 8 for connecting the first and second optical paths 2 and 4, and a second optical coupler 12 including a third optical path 10 directionally coupled to the loop optical path 8.

A part or the whole of the loop optical path 8 is provided by a nonlinear optical medium NL. The coupling ratio of the first optical coupler 6 is set substantially to 1:1.

The operation of this NOLM will now be described in brief. When probe light having a wavelength $\lambda$probe is input into the first optical path 2 of the optical coupler 6 and an optical signal having a wavelength $\lambda$sig is input into the third optical path 10 of the optical coupler 12, a converted optical signal having a wavelength $\lambda$probe is output from the second optical path 4 of the optical coupler 6. The probe light may be continuous-wave (CW) light or optical pulses. In this example shown, the probe light is CW light.

The probe light is divided into two components having the same power by the optical coupler 6. The two components propagate in the loop optical path 8 clockwise and counterclockwise, respectively, with exactly the same optical path length, and are next subjected to a phase shift φ for each by the nonlinear optical medium NL. Thereafter, they are combined by the optical coupler 6. In combining these components at the optical coupler 6, they are equal in power and phase to each other, so that resultant light obtained by this combination is output from the first optical path 2 but not output from the second optical path 4 as if it is reflected by a mirror.

When an optical signal is input from the middle of the loop optical path 8 by the optical coupler 12, this optical signal propagates in the loop optical path 8 in only one direction thereof (e.g., clockwise in FIG. 1), and the nonlinear refractive index of the nonlinear optical medium NL changes for the light propagating in this direction only when on-pulses pass therethrough. Accordingly, in combining the two components of the probe light at the optical coupler 6, the phases of the two components of the probe light at their portions synchronous with off-pulses of the optical signal are coincident with each other, and the phases of the two components of the probe light at their portions synchronous with on-pulses of the optical signal are different from each other. Letting Δφ denote a phase difference in the latter case, an output proportional to $[1-\cos(\Delta\phi)]/2$ is obtained from the second optical path 4 of the optical coupler 6.

By setting the power of the input optical signal so that the phase difference becomes π, it is possible to perform a switching operation such that the two components combined upon passing of the on-pulses are output only from the second optical path 4. Thus, the conversion from the optical signal having the wavelength $\lambda$sig into the converted optical signal having the wavelength $\lambda$probe is performed. That is, wavelength conversion is performed on the data of the optical signal.

Assuming that an optical Kerr effect (cross-phase modulation (XPM) by the optical signal and the probe light) is used as the nonlinear optical effect, the phase shift Δφ is proportional to γPL, where γ is the nonlinear coefficient of the nonlinear optical medium NL, P is the optical power in the nonlinear optical medium NL, and L is the length of interaction of the optical Kerr effect in the nonlinear optical medium NL.

Figure 2:
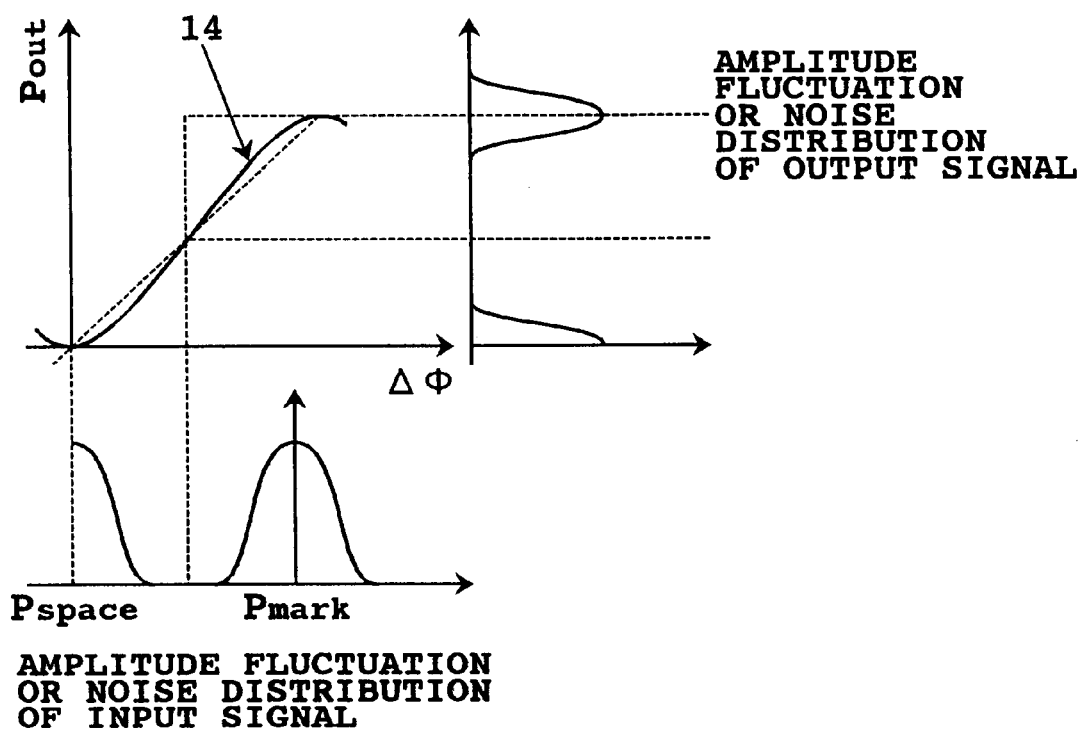
FIG. 2 is a graph showing the output characteristic of the NOLM with respect to a phase difference Δφ.

FIG. 2 is a graph showing the output characteristic of the NOLM with respect to the phase difference Δφ. In a main part of this graph, the vertical axis represents the power Pout of the converted optical signal output from the second optical path 4, and the horizontal axis represents the phase difference φ. In the cosine curve depicted by reference numeral 14, the phase difference Δφ giving a minimum value corresponds to 0, and the phase difference Δφ giving a maximum value corresponds to π. Accordingly, by making the "0" level (Pspace) and the "1" level (Pmark) of the input optical signal respectively correspond to 0 and π of the phase difference Δφ, noise accompanying the input optical signal can be suppressed. This is due to the fact that the conversion in accordance with [1−cos(Δφ)]/2 exhibits a saturable characteristic near the leading edge or the peak of each pulse unlike linear amplification conversion.

A typical example of the nonlinear optical medium NL in the NOLM is an optical fiber. A dispersion shifted fiber (DSF) is mainly used as the optical fiber used in the NOLM, and its length is usually several km. Further, a NOLM using an SOA (semiconductor optical amplifier) as the nonlinear optical medium NL has also been proposed (SLALOM).

The SOA type NOLM is superior in compactness and integration. However, it has disadvantages such that the signal-to-noise (S/N) ratio upon the conversion is reduced by the influence of amplified spontaneous emission (ASE) noise added from the SOA and that speed limitation is caused by a carrier effect.

On the other hand, the fiber type NOLM has an advantage such that the response time of the third-order nonlinear optical effect in the fiber is very short as on the order of femto-seconds. However, since a long fiber is required, high-precision dispersion management is necessary to eliminate speed limitation. The fiber type NOLM has other problems such that it is difficult to cope with the dependence of an input optical signal upon a polarization state and with polarization fluctuations in the loop.

The present inventor proposed a compact NOLM using a highly nonlinear dispersion shifted fiber (HNL-DSF) in Japanese Patent Application No. 10-176316 (filed Jun. 23, 1998). The present invention mainly provides a high-performance waveform shaping device configured by cascading a plurality of NOLMs each similar to that proposed above by the present inventor to realize optical signal processing such as optical 2R by using this waveform shaping device. The term of "2R" means two functions of Reshaping (amplitude regeneration) and Regeneration (waveform equalization and noise suppression).

As a nonlinear optical effect applicable to optical signal processing in an optical communication system, it is considered to apply an optical Kerr effect such as three-wave mixing in a second-order nonlinear optical medium or self-phase modulation (SPM), cross-phase modulation (XPM), and four-wave mixing (FWM) in a third-order nonlinear optical medium. Examples of the second-order nonlinear optical medium include InGaAs and $LiNbO_3$. Examples of the third-order nonlinear optical medium include an optical fiber and a semiconductor medium such as a semiconductor optical amplifier (SOA) and a distributed feedback laser diode (DFB-LD).

In particular, the present invention may employ an optical Kerr effect in an optical fiber. A single-mode fiber is suitable as the optical fiber, and especially a dispersion-shifted fiber (DSF) having a relatively small chromatic dispersion is preferable.

In general, the third-order nonlinear coefficient γ of an optical fiber is expressed as follows:

$$\gamma = \omega n_2 / c A_{\mathit{eff}} \quad (1)$$

where ω is the optical angular frequency, c is the velocity of light in a vacuum, and $n_2$ and $A_{\mathit{eff}}$ are the nonlinear refractive index and the effective core area of the optical fiber, respectively.

The nonlinear coefficient γ of a conventional DSF is as small as about 2.6 $W^{-1}$ $km^{-1}$, so a fiber length of several km to 10 km or more is necessary to obtain sufficient conversion efficiency. If a shorter DSF can be used to realize sufficient conversion efficiency, the zero-dispersion wavelength can be managed with high accuracy, thereby realizing high-speed and wide-band conversion.

In general, for enhancement of the third-order nonlinear effect of an optical fiber, it is effective to increase a light intensity by increasing the nonlinear refractive index $n_2$ in Eq. (1) or by reducing a mode field diameter (MFD) corresponding to the effective core area $A_{\mathit{eff}}$ in Eq. (1).

The nonlinear refractive index $n_2$ can be increased by doping the clad with fluorine or the like or by doping the core with a high concentration of $GeO_2$, for example. By doping the core with 25 to 30 mol % of $GeO_2$, a large value of $5 \times 10^{-20}$ $m^2/W$ or more (about $3.2 \times 10^{-20}$ $m^2/W$ for a usual silica fiber) can be obtained as the nonlinear refractive index $n_2$.

On the other hand, the MFD can be reduced by designing a relative refractive-index difference Δ between the core and the clad or by designing the core shape. Such design of a DSF is similar to that of a dispersion compensating fiber (DCF). For example, by doping the core with 25 to 30 mol % of $GeO_2$ and setting the relative refractive-index difference Δ to 2.5 to 3.0%, a small value of less than 4 μm can be obtained as the MFD. Owing to the combined effects of increasing the nonlinear refractive index $n_2$ and reducing the MFD, an optical fiber (HNL-DSF) having a large value of 15 $W^{-1}$ $km^{-1}$ or more as the nonlinear coefficient γ can be obtained.

As another important factor, the HNL-DSF having a large nonlinear coefficient γ as mentioned above has a zero dispersion in a wavelength band used. This point can also be satisfied by setting each parameter in the following manner. That is, in general, a dispersion in a usual DCF increases in a normal dispersion region with an increase in refractive index difference Δ under the condition that the MFD is set constant. On the other hand, the dispersion decreases with an increase in core diameter, whereas the dispersion increases with a decrease in core diameter. Accordingly, the dispersion can be reduced to zero by increasing the core diameter under the condition that the MFD is set to a certain value in a wavelength band used.

A phase shift due to the optical Kerr effect in an optical fiber having a length L is proportional to $\gamma P_p L$ where $P_p$ is the average pump light power. Accordingly, the fiber having a nonlinear coefficient γ of 15 $W^{-1}$ $km^{-1}$ can achieve the same conversion efficiency as that by a usual DSF even when the fiber length is reduced to about $2.6/15 \approx 1/5.7$ as compared with the usual DSF. As mentioned above, the usual DSF requires a length of about 10 km for sufficient conversion efficiency. To the contrary, the HNL-DSF having a large nonlinear coefficient γ as mentioned above can obtain a similar effect with a reduced length of about 1 to 2 km. Practically, loss in the fiber is reduced in an amount corresponding to a decrease in fiber length, so that the fiber can be further shortened to obtain the same efficiency. Thus in a short fiber, controllability of the zero-dispersion wavelength can be improved, and ultra wide-band conversion can be achieved as will be hereinafter described. Further, when the fiber length is several km, polarization can be fixed, that is, a polarization maintaining ability can be ensured. Therefore, application of the HNL-DSF to the present invention is greatly effective in achieving high conversion efficiency and wide conversion band and removing polarization dependence.

To effectively produce an optical Kerr effect, especially XPM by using an optical fiber and improve the efficiency of conversion from the optical signal into the converted optical signal, phase matching between the probe light and the optical signal must be achieved. The phase matching will now be described with reference to FIG. 3.

Figure 3:
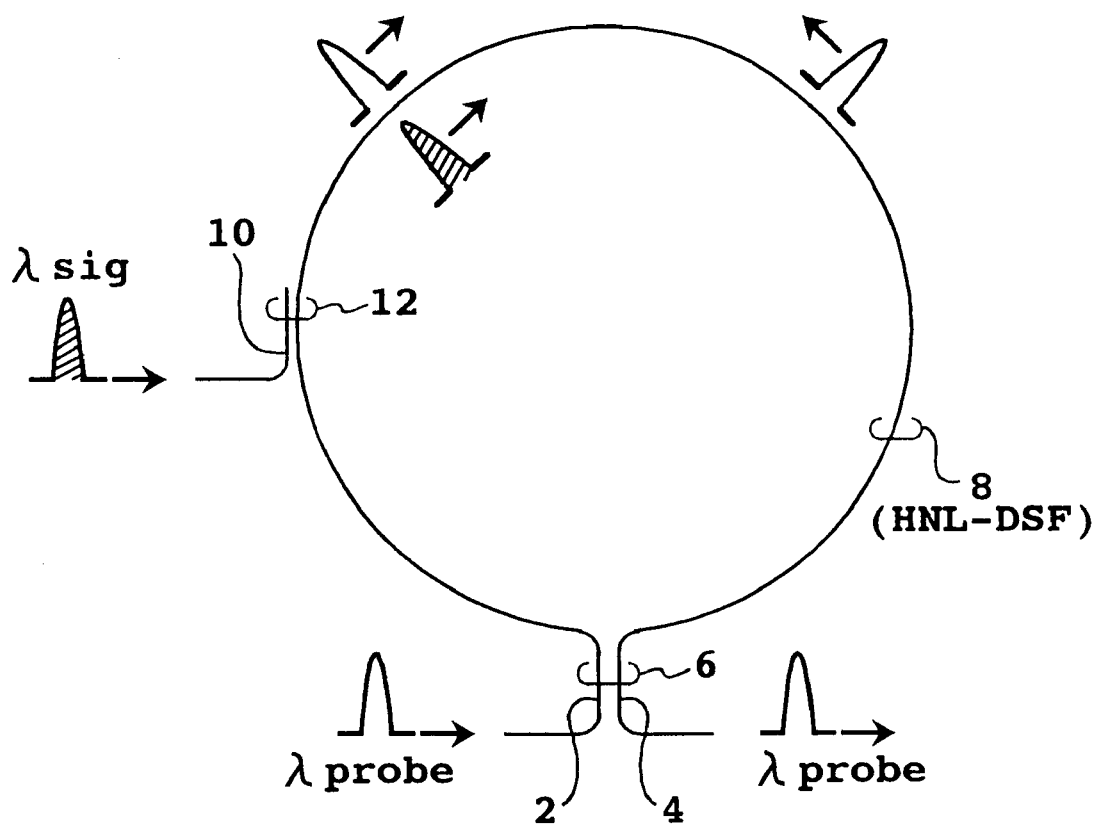
FIG. 3 is a diagram for illustrating phase matching in the NOLM.

FIG. 3 is a diagram for illustrating the phase matching in the NOLM. It is now assumed that both the probe light having a wavelength λprobe supplied to the optical path 2 and the optical signal having a wavelength λsig supplied to the optical path 10 are optical pulses. The optical pulses as the probe light are branched to first probe pulses propagating clockwise in the loop optical path 8 and second probe pulses propagating counterclockwise in the loop optical path 8 by the optical coupler 6. The optical pulses as the optical signal are passed through the optical coupler 12 and propagate clockwise as signal pulses in the loop optical path 8.

A phase matching condition in the loop optical path 8 is given by timing coincidence of the signal pulses and the first probe pulses both propagating clockwise in the loop optical path 8. If the timing coincidence of the signal pulses and the first probe pulses is not achieved, optical Kerr shift by XPM is limited to cause a difficulty of effective switch operation or gate operation.

Since the wavelength of the signal pulses and the wavelength of the first probe pulses are different from each other, the group velocity of the signal pulses and the group velocity of the first probe pulses are different from each other, resulting in occurrence of timing deviation proportional to the length of the loop optical path 8 (walk-off). To avoid this possibility, wavelength location is preferably selected so that the group velocity of the signal pulses and the first probe pulses become equal to each other.

The most effective wavelength location for minimizing the timing deviation is obtained by locating the wavelength of the signal pulses and the wavelength of the first probe pulses in substantially symmetrical relationship with respect to the zero-dispersion wavelength of the loop optical path 8. over a wide band near the zero-dispersion wavelength, the chromatic dispersion changes substantially linearly, so that a good phase matching condition can be obtained by making the group velocities of the signal pulses and the first probe pulses coincide with each other by the above-mentioned wavelength location.

Thus according to an aspect of the present invention, the phase matching condition can be obtained by satisfying the relation of λsig+λprobe=2λ$_0$ where λ$_0$ is the zero-dispersion wavelength of the loop optical path, thus improving the efficiency of conversion from the optical signal into the converted optical signal.

However, if there are variations in the zero-dispersion wavelength itself along the fiber, the group velocities become different from each other in spite of the above wavelength location, causing a limit to a conversion band and a convertible signal rate. Thus, a conversion band by the fiber is limited by dispersion. If dispersion along the fiber is perfectly controlled, for example, if a fiber having a zero-dispersion wavelength uniform over the entire length (exactly, the nonlinear length) is fabricated, a conversion band infinite in fact (unlimitedly wide in a range where the wavelength dependence of dispersion is linear) could be obtained by locating the wavelengths of the probe light and the optical signal in symmetrical relationship with respect to this uniform zero-dispersion wavelength. Actually, however, the zero-dispersion wavelength varies along the fiber, causing a deviation of the phase matching condition from an ideal condition to result in a limit of the conversion band.

A first method for realizing a wide conversion band is to use an HNL-DSF as a part or the whole of the loop optical path 8. In the case that the HNL-DSF is used, sufficient conversion can be achieved with a length of about 1 to 2 km, so that dispersion controllability can be improved to easily obtain a wide-band characteristic. In particular, by suppressing variations in the zero-dispersion wavelength near an input end where the efficiency of production of an optical Kerr effect is high, the conversion band can be widened most efficiently. Further, by cutting the fiber into a plurality of small sections and next joining any of the small sections similar in zero-dispersion wavelength by splicing or the like (in an order different from the initial order counted from a fiber end), a wide conversion band can be obtained although an average dispersion over the entire length is unchanged.

Alternatively, many fibers each having a length (e.g., hundreds of meters or less) allowing high-accuracy dispersion control required to obtain a sufficiently wide conversion band may be prepared in advance, and any of these fibers having a required zero-dispersion wavelength may be combined to be spliced, thereby fabricating a fiber having a length required to obtain a required conversion efficiency.

In the case of widening the conversion band as mentioned above, it is effective to gather the sections of the fiber having less variations in zero-dispersion wavelength near an input end (e.g., both ends of a nonlinear optical medium) where the light intensity is high. Further, the conversion band can be further widened by increasing the number of sections of the fiber as required, or by alternately arranging the positive and negative signs of dispersion at a relatively large-dispersion portion separate from the input end to thereby suitably combine the small sections.

The degree of reducing the length of each section in cutting the optical fiber may be based on the nonlinear length, for example. The phase matching in a third-order nonlinear effect in a fiber sufficiently shorter than the nonlinear length may be considered to depend on the average dispersion of the fiber. As an example, in a third-order nonlinear effect using a pump light power of about 30 mW in a fiber having a nonlinear coefficient γ of 2.6 $W^{-1}$ $km^{-1}$, the nonlinear length is about 12.8 km. In this example, the length of each section is set to about 1/10 of 12.8 km, i.e., about 1 km. As another example, in a third-order nonlinear effect using a pump light power of about 30 mW in a fiber having a nonlinear coefficient y of 15 $W^{-1}$ $km^{-1}$, the nonlinear length is about 2.2 km. In this example, the length of each section is set to about 1/10 of 2.2 km, i.e., about 200 m. In any case, a wide conversion band can be obtained by measuring an average zero-dispersion wavelength of fiber sections each sufficiently shorter than the nonlinear length and combining any of the fiber sections having almost the same zero-dispersion wavelength to thereby configure a fiber achieving a required conversion efficiency.

Additional information on such a method of broadening the band of FWM by a fiber is described in detail in Japanese Patent Application No. 10-176316.

It is effective to set the zero-dispersion wavelength of a fiber and the wavelength of pump light substantially equal to each other for the production of FWM. However, if the power of pump light, signal light, or converted light exceeds a threshold value of stimulated Brillouin scattering (SBS) in the fiber, the efficiency of production of FWM is reduced. To suppress the effect of SBS, the pump light or signal light is subjected to frequency modulation or phase modulation. In such modulation, a modulating rate of hundreds of kHz is good enough, and in the case that the signal light is a high-speed signal having a signal rate on the order of Gb/s, the modulation has almost no adverse effect on the signal light.

The operation of the NOLM shown in FIG. 1 requires maintaining the polarization state of the probe light in the loop optical path 8. That is, after the two components of the probe light separated by the optical coupler 6 propagate in the loop optical path 8 clockwise and counterclockwise, the two components must be returned to the optical coupler 6 in the same polarization state.

By using the HNL-DSF, the loop optical path 8 can be configured with a short length enough to maintain the polarization state. For example, the polarization state in the loop optical path 8 can be adjusted by using a polarization controller.

Basically, the polarization state of the optical signal is desirably made substantially coincident with the polarization state of the probe light. However, the polarization states of the optical signal and the probe light may be influenced by polarization dispersion or the like in the fiber. Accordingly, it is desirable to optimize the polarization states of the optical signal and the probe light so that the power of the output light becomes maximum.

Figure 4:
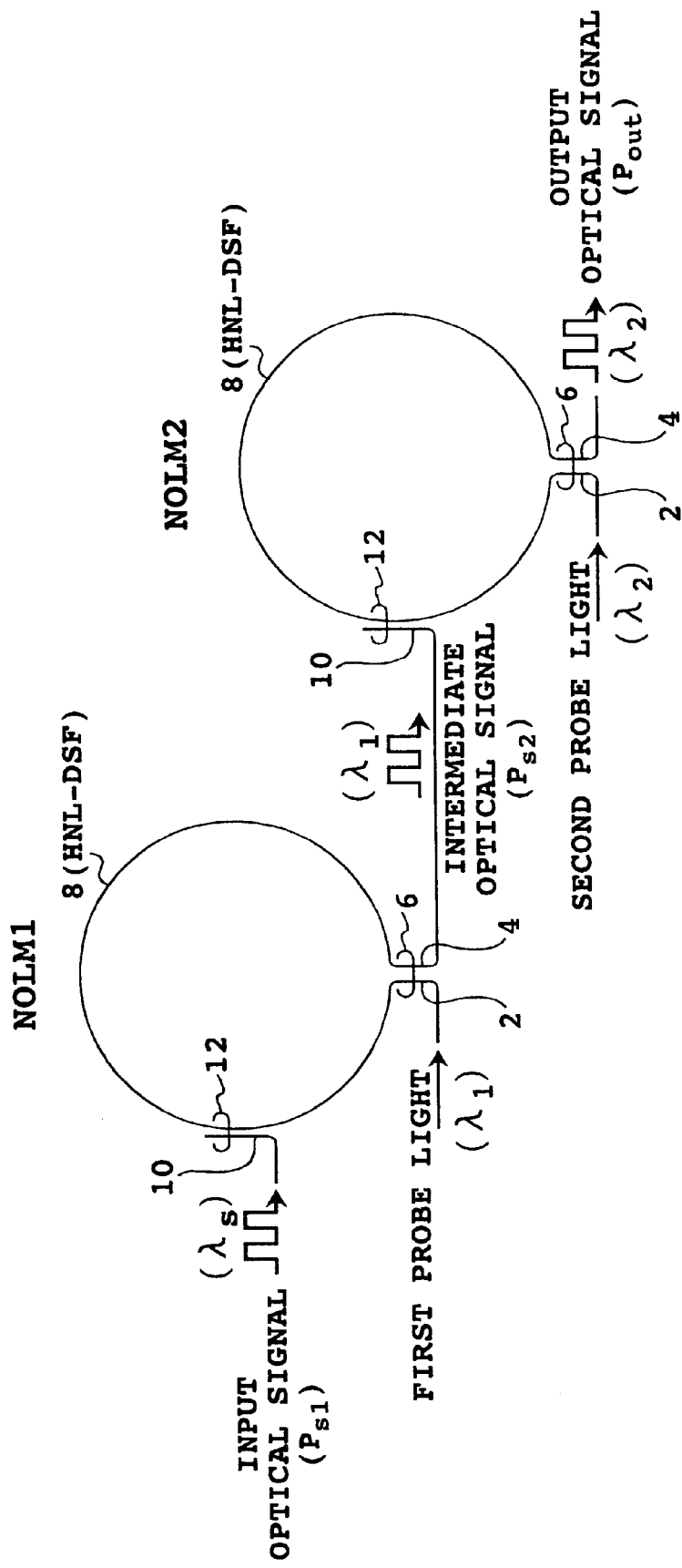
FIG. 4 is a diagram showing a first preferred embodiment of the device according to the present invention.

FIG. 4 is a diagram showing a first preferred embodiment of the device according to the present invention. This device includes a first nonlinear loop mirror (NOLM1) and a second nonlinear loop mirror (NOLM2) cascaded with each other. Each of the NOLM1 and the NOLM2 includes a first optical coupler 6 including first and second optical paths 2 and 4 directionally coupled to each other, a loop optical path 8 for connecting the first and second optical paths 2 and 4, and a second optical coupler 12 including a third optical path 10 directionally coupled to the loop optical path 8.

The coupling ratio of the first optical coupler 6 is set substantially to 1:1. A part or the whole of the loop optical path 8 is provided by a nonlinear optical medium. More specifically, the loop optical path 8 is provided by an HNL-DSF in this preferred embodiment, so as to obtain a wide conversion band and the above-mentioned additional effects.

To cascade the NOLM1 and the NOLM2, the second optical path 4 of the NOLM1 is optically connected to the third optical path 10 of the NOLM2.

First probe light having a wavelength $\lambda_1$ is supplied to the first optical path 2 of the NOLM1. An input optical signal having a wavelength $\lambda_s$ ($\neq \lambda_1$) and a power $P_{s1}$ is supplied to the third optical path 10 of the NOLM1. As a result, an intermediate optical signal having the wavelength $\lambda_1$ and a power $P_{s2}$ and synchronous with the input optical signal is output from the second optical path 4 of the NOLM1. The intermediate optical signal output from the NOLM1 is supplied to the third optical path 10 of the NOLM2. Second probe light having a wavelength $\lambda_2$ ($\neq \lambda_1$) is supplied to the first optical path 2 of the NOLM2. As a result, an output optical signal having the wavelength $\lambda_2$ and a power Pout and synchronous with the intermediate optical signal is output from the second optical path 4 of the NOLM2.

Each of the first and second probe lights may be CW light or clock pulses having a frequency equal to or different from the bit rate of the input optical signal and timewise synchronous with the input optical signal.

While the preferred embodiment shown in FIG. 4 has a two-stage configuration using the two nonlinear loop mirrors, three or more nonlinear loop mirrors may be cascaded to configure a similar device having three or more stages in the present invention.

The device having such a multistage configuration (inclusive of the above two-stage configuration) has at least two features as described below.

Figure 5A:
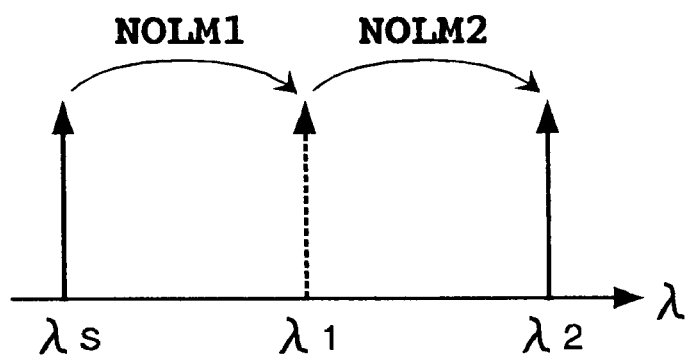
FIGS. 5A and 5B are diagrams showing examples of wavelength conversion in the device according to the present invention.
Figure 5B:
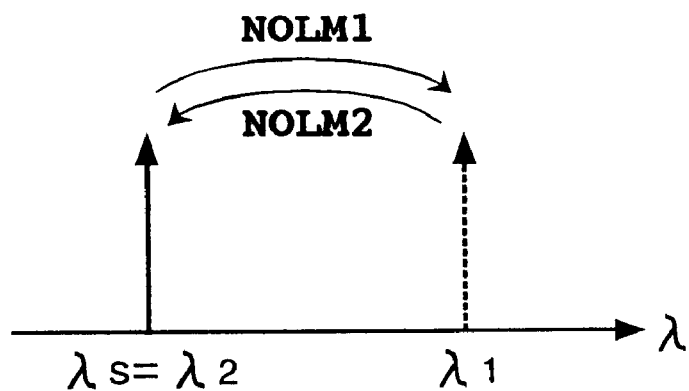

The first feature is that the degree of freedom of wavelength conversion is large. For example, by setting the sign of the difference between the wavelength $\lambda_1$ and the wavelength $\lambda_s$ equal to the sign of the difference between the wavelength $\lambda_2$ and the wavelength $\lambda_1$ as shown in FIG. 5A, the wavelength conversion can be made larger than that in the case of the one-stage configuration. Alternatively, by setting the wavelength $\lambda_2$ substantially equal to the wavelength $\lambda_s$ as shown in FIG. 5B, waveform shaping can be performed without wavelength conversion. Such waveform shaping without wavelength conversion is impossible in the one-stage configuration. Although not shown, the wavelength $\lambda_2$ may be set between the wavelength $\lambda_1$ and the wavelength $\lambda_s$. In this case, the wavelength $\lambda_1$ and the wavelength $\lambda_s$ can be made largely different from each other, so that unwanted light can be easily removed, for example. While this feature has been described for the two-stage configuration, more flexible wavelength conversion can be performed by increasing the number of stages to three or more.

The second feature is that the waveform shaping function in the device according to the present invention is improved as compared with the case of the one-stage configuration. As mentioned above, the input-output characteristic in the one-stage configuration is expressed as $[1-\cos(\Delta\phi)]/2=\sin^2(\Delta\phi/2)$. Accordingly, the normalized input-output function (characteristic function) fn(x) in an n-stage configuration (where n is a natural number) can be expressed as follows:

$$fn(x) = \sin^2[\pi f_{(n-1)}(x)/2]$$

$$f_0(x) = x$$

Figure 6:
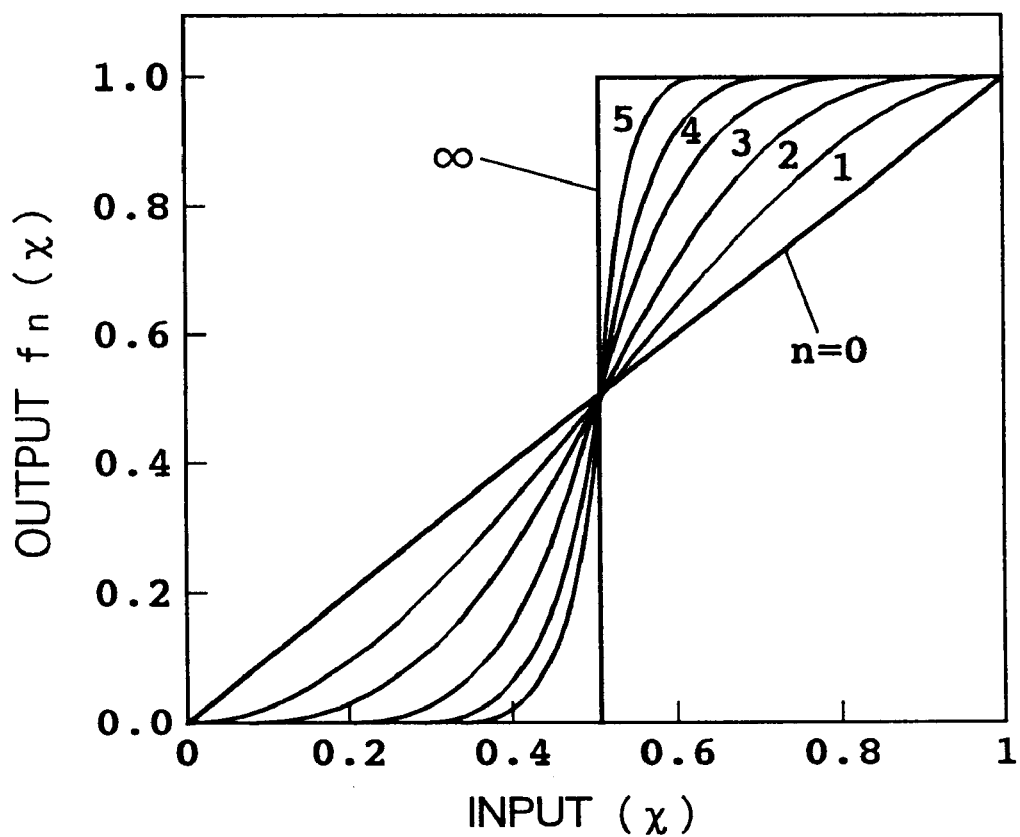
FIG. 6 is a graph showing a characteristic function of cascaded NOLMs.

FIG. 6 is a graph obtained by plotting this function. It is understood from FIG. 6 that the larger the number of stages, the more the operation of the device approaches a digital operation (corresponding to the case of n=∞). That is, the operation in the case of n=2 approaches a digital operation more than the operation in the case of n=1, so that more excellent waveform shaping characteristic can be expected. Accordingly, the present invention can provide excellent waveform shaping and noise suppression that cannot be obtained by the conventional NOLM having a one-stage configuration.

In the preferred embodiment shown in FIG. 4, an HNL-DSF is used as the loop optical path 8 of each of the NOLM1 and the NOLM2. The dispersion of the HNL-DSF can be suitably optimized according to the bit rate or pulse shape of signal light. For example, in the case of a high-bit-rate signal using short pulses, the dispersion is preferably set so that the walk-off between two pulses (refer to the previous description with reference to FIG. 3) does not occur. As an example, it is considered to arrange the zero-dispersion wavelength of the HNL-DSF near the intermediate between the wavelength of the signal light (the wavelength $\lambda_s$ of the input optical signal or the wavelength $\lambda_1$ of the intermediate optical signal) and the wavelength of the probe light (the wavelength $\lambda_1$ of the first probe light or the wavelength $\lambda_2$ of the second probe light). In this case, the two pulses have substantially the same group velocity in each of the NOLM1 and the NOLM2, so that the walk-off can be minimized. Further, the determination of which of the signal light wavelength and the probe light wavelength is to be arranged in a normal dispersive region and the other is to be arranged in an anomalous dispersive region may be suitably optimized according to the characteristics.

Thus according to an aspect of the present invention, the HNL-DSF providing the loop optical path 8 of the NOLM1 has a zero-dispersion wavelength substantially intermediate between the wavelength $\lambda_1$ and the wavelength $\lambda_s$, and the HNL-DSF providing the loop optical path 8 of the NOLM2 has a zero-dispersion wavelength substantially intermediate between the wavelength $\lambda_1$ and the wavelength $\lambda_2$. With this arrangement, the occurrence of the walk-off can be prevented to allow waveform shaping of a high-bit-rate signal using short pulses.

Alternatively, the zero-dispersion wavelength may be set longer or shorter than the wavelengths of the two pulses. In this case, the walk-off cannot be minimized. However, the following merits can be obtained. In the case of setting the zero-dispersion wavelength to a longer wavelength, both the signal light wavelength and the probe light wavelength fall in the normal dispersive region, so that a modulation instability effect can be suppressed. Conversely, in the case of setting the zero-dispersion wavelength to a shorter wavelength, both the signal light wavelength and the probe light wavelength fall in the anomalous dispersive region, so that a pulse compression effect can be used. Such setting of the zero-dispersion wavelength may be determined according to actual system conditions.

Thus according to an aspect of the present invention, the wavelengths $\lambda_1$ and $\lambda_s$ fall in one of the normal dispersive region and the anomalous dispersive region of the HNL-DSF providing the loop optical path 8 of the NOLM1, and the wavelengths $\lambda_1$ and $\lambda_2$ fall in one of the normal dispersive region and the anomalous dispersive region of the HNL-DSF providing the loop optical path 8 of the NOLM2. With this arrangement, a modulation instability effect can be suppressed or a pulse compression effect can be used.

In the preferred embodiment shown in FIG. 4, each loop optical path 8 is configured from an HNL-DSF. In the HNL-DSF, its third-order nonlinear coefficient can be increased 5 to 10 times that of a conventional DSF, so that the product of the length and the optical power required to set the phase difference $\Delta\phi$ to $\pi$ can be reduced to $\frac{1}{5}$ to $\frac{1}{10}$. Accordingly, a required length for the same signal power can also be reduced to $\frac{1}{5}$ to $\frac{1}{10}$, with the result that a sufficient characteristic can be obtained with a reduced length of 1 km or less. As a result, it is possible to provide a NOLM which can suppress a signal rate limit due to chromatic dispersion, can eliminate the polarization dependence of an input optical signal, and can eliminate the need for measures against polarization fluctuations in the loop optical path 8.

Thus according to an aspect of the present invention, each loop optical path 8 is provided by an optical fiber as a nonlinear optical medium. The optical fiber has a nonlinear coefficient large enough to reduce the length of the optical fiber to such an extent that the optical fiber has a polarization plane preserving ability. Accordingly, the polarization dependence of an input optical signal can be reduced. Alternatively, a polarization maintaining fiber as the optical fiber providing each loop optical path 8 may be used for the same purpose.

Figure 7:
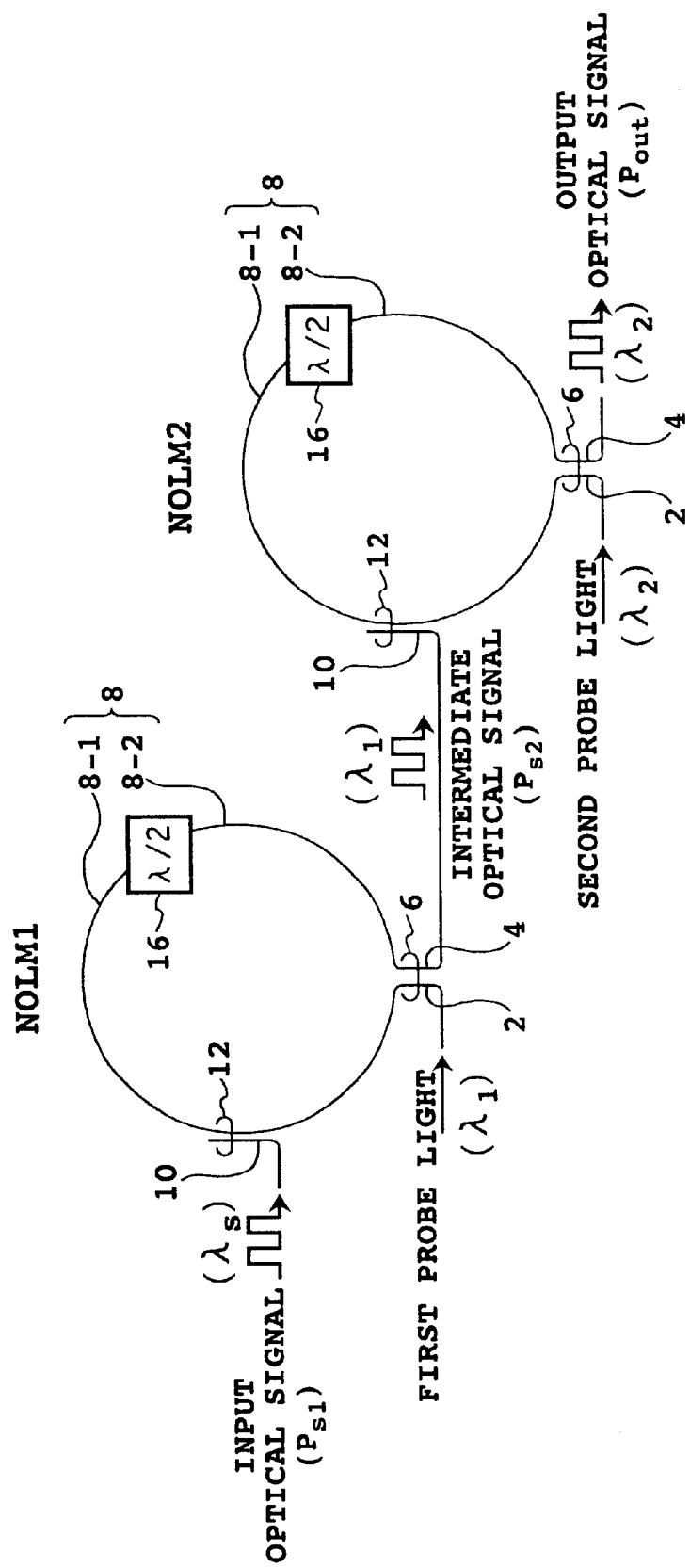
FIG. 7 is a diagram showing a second preferred embodiment of the device according to the present invention.

FIG. 7 is a diagram showing a second preferred embodiment of the device according to the present invention. In this preferred embodiment, the loop optical path 8 of each of the NOLM1 and the NOLM2 is composed of half portions 8-1 and 8-2 each for giving a phase shift $\Delta\phi/2$. Each of the half portions 8-1 and 8-2 is provided by a polarization maintaining fiber (PMF) type HNL-DSF.

Since the total phase shift given by both the half portions 8-1 and 8-2 becomes $\Delta\phi$, waveform-shaping can be performed as in the preferred embodiment shown in FIG. 4.

Particularly in this preferred embodiment, a $\lambda/2$ plate function 16 for providing orthogonal polarization states is additionally provided in the vicinity of a middle point of each loop optical path 8, i.e., at a connection point between the half portions 8-1 and 8-2. For example, the $\lambda/2$ plate function 16 is obtained by splicing the half portions 8-1 and 8-2 so that their principal axes become orthogonal to each other.

With this arrangement, the dependence of conversion efficiency upon the polarization state of an input optical signal can be removed. Furthermore, the addition of the $\lambda/2$ plate function 16 can suppress polarization dispersion due to a difference in group velocity between two polarization modes of each polarization maintaining fiber.

More specifically, by 45° inclining the plane of polarization of each probe light to be introduced through the optical coupler 6 into the loop optical path 8 with respect to the principal axis of each polarization maintaining fiber, it is possible to obtain a conversion efficiency not dependent on the polarization state of an optical signal to be introduced from the optical coupler 12 of the NOLM1 into the loop optical path 8.

The conversion efficiency is herein defined as the ratio between the power of an input optical signal to be introduced through the optical coupler 12 into the loop optical path 8 of the NOLM1 and the power of an output optical signal to be output from the loop optical path 8 through the optical coupler 6 of the NOLM2.

Figure 8:
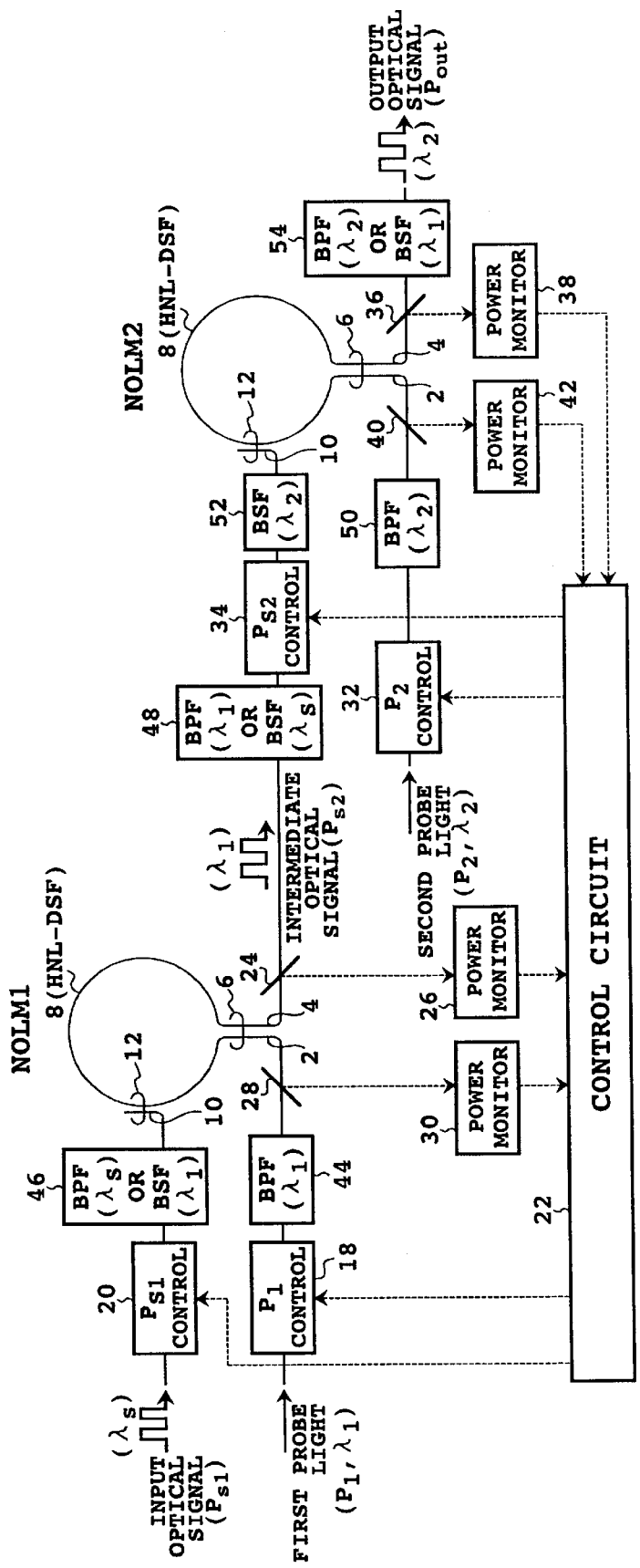
FIG. 8 is a block diagram showing a third preferred embodiment of the device according to the present invention.

FIG. 8 is a block diagram showing a third preferred embodiment of the device according to the present invention. The operation of the NOLM1 is largely dependent on the magnitude of a phase shift in the optical Kerr effect, especially in XPM. Accordingly, it is desirable that the powers of the input optical signal and the first probe light to be introduced into the loop optical path 8 of the NOLM1 can be adjusted. To this end, this preferred embodiment employs a power controller 18 for adjusting the power $P_1$ of the first probe light and a power controller 20 for adjusting the power $P_{s1}$ of the input optical signal. As each of the power controllers 18 and 20, a variable optical attenuator, a variable gain optical amplifier, or the combination thereof may be used.

The power controllers 18 and 20 are controlled by a control circuit 22. For example, the control circuit 22 controls at least one of the power controllers 18 and 20 according to an output signal from a power monitor 26 for receiving a part of the intermediate optical signal which part is extracted from the second optical path 4 by an optical coupler 24 so that the power of the intermediate optical signal detected by the power monitor 26 is increased. Alternatively, the control circuit 22 may control at least one of the power controllers 18 and 20 according to an output signal from a power monitor 30 for receiving a part of light output from the first optical path 2 by an optical coupler 28 in a direction opposite to the propagation direction of the first probe light so that the power detected by the power monitor 30 is decreased. The light output in the direction opposite to the propagation direction of the first probe light has the same wavelength $\lambda_1$ as that of the first probe light.

By performing such control, the power of at least one of the input optical signal and the first probe light can be controlled so that a proper phase difference is generated in the loop optical path 8 of the NOLM1. Therefore, a high conversion efficiency can be automatically maintained.

On the other hand, the operation of the NOLM2 is also largely dependent on the magnitude of a phase shift in the optical Kerr effect, especially in XPM. Accordingly, it is desirable that the powers of the intermediate optical signal and the second probe light to be introduced into the loop optical path 8 of the NOLM2 can be adjusted. To this end, this preferred embodiment employs a power controller 32 for adjusting the power $P_2$ of the second probe light and a power controller 34 for adjusting the power $P_{s2}$ of the intermediate optical signal. As each of the power controllers 32 and 34, a variable optical attenuator, a variable gain optical amplifier, or the combination thereof may be used.

The power controllers 32 and 34 are controlled by the control circuit 22. For example, the control circuit 22 controls at least one of the power controllers 32 and 34 according to an output signal from a power monitor 38 for receiving a part of the output optical signal which part is extracted from the second optical path 4 by an optical coupler 36 so that the power of the output optical signal detected by the power monitor 38 is increased. Alternatively, the control circuit 22 may control at least one of the power controllers 32 and 34 according to an output signal from a power monitor 42 for receiving a part of light output from the first optical path 2 by an optical coupler 40 in a direction opposite to the propagation direction of the second probe light so that the power detected by the power monitor 42 is decreased. The light output in the direction opposite to the propagation direction of the second probe light has the same wavelength $\lambda_2$ as that of the second probe light.

By performing such control, the power of at least one of the intermediate optical signal and the second probe light can be controlled so that a proper phase difference is generated in the loop optical path 8 of the NOLM2. Therefore, a high conversion efficiency can be automatically maintained.

Optical filters 44, 46, and 48 are used to suppress noise light outside the band of the first probe light, the input optical signal, or the intermediate optical signal in the NOLM1. The optical filter 44 is provided between the power controller 18 and the first optical path 2 to act on the first probe light to be introduced from the first optical path 2 through the optical coupler 6 into the loop optical path 8. The optical filter 44 may be provided by an optical bandpass filter (BPF) having a pass band including the wavelength $\lambda_1$ of the first probe light.

The optical filter 46 is provided between the power controller 20 and the third optical path 10 to act on the input optical signal to be introduced from the third optical path 10 through the optical coupler 12 into the loop optical path 8. The optical filter 46 may be provided by an optical bandpass filter having a pass band including the wavelength $\lambda_s$ of the input optical signal or an optical bandstop filter (BSF) having a stop band including the wavelength $\lambda_1$ of the first probe light.

The reason for improvement in SNR also in the case of using such an optical bandstop filter is that the input optical-signal to be subjected to waveform shaping is generally accompanied by ASE noise by transmission and that the SNR of the intermediate optical signal can be improved by preliminarily removing a component of ASE noise in the vicinity of the wavelength $\lambda_1$ of the intermediate optical signal.

The optical filter 48 is connected to the second optical path 4 to act on the intermediate optical signal output from the loop optical path 8 of the NOLM1 through the optical coupler 6 to the second optical path 4. The optical filter 48 may be provided by an optical bandpass filter having a pass band including the wavelength $\lambda_1$ of the intermediate optical signal or an optical bandstop filter having a stop band including the wavelength $\lambda_s$ of the input optical signal.

The center wavelength in the pass band or the stop band of each filter coincides with the center wavelength of the first probe light or the center wavelength of the input optical signal. The width of the pass band or the stop band of each filter is substantially equal to or slightly larger than the width of the band of the input optical signal. Specific examples of each filter include a dielectric multilayer filter and a fiber grating filter.

Optical filters 50, 52, and 54 are used to suppress noise light outside the band of the second probe light, the intermediate optical signal, or the output optical signal in the NOLM2. The optical filter 50 is provided between the power controller 32 and the first optical path 2 to act on the second probe light to be introduced from the first optical path 2 through the optical coupler 6 into the loop optical path 8. The optical filter 50 may be provided by an optical bandpass filter having a pass band including the wavelength $\lambda_2$ of the second probe light.

The optical filter 52 is provided between the power controller 34 and the third optical path 10 to act on the intermediate optical signal to be introduced from the third optical path 10 through the optical coupler 12 into the loop optical path 8. The optical filter 52 may be provided by an optical bandstop filter having a stop band including the wavelength $\lambda_2$ of the second probe light.

The optical filter 54 is connected to the second optical path 4 to act on the output optical signal output from the loop optical path 8 of the NOLM2 through the optical coupler 6 to the second optical path 4. The optical filter 54 may be provided by an optical bandpass filter having a pass band including the wavelength $\lambda_2$ of the output optical signal or an optical bandstop filter having a stop band including the wavelength $\lambda_1$ of the intermediate optical signal.

The center wavelength in the pass band or the stop band of each filter coincides with the center wavelength of the second probe light or the center wavelength of the intermediate optical signal. The width of the pass band or the stop band of each filter is substantially equal to or slightly larger than the width of the band of the input optical signal or the intermediate optical signal. Specific examples of each filter include a dielectric multilayer filter and a fiber grating filter.

Figure 9:
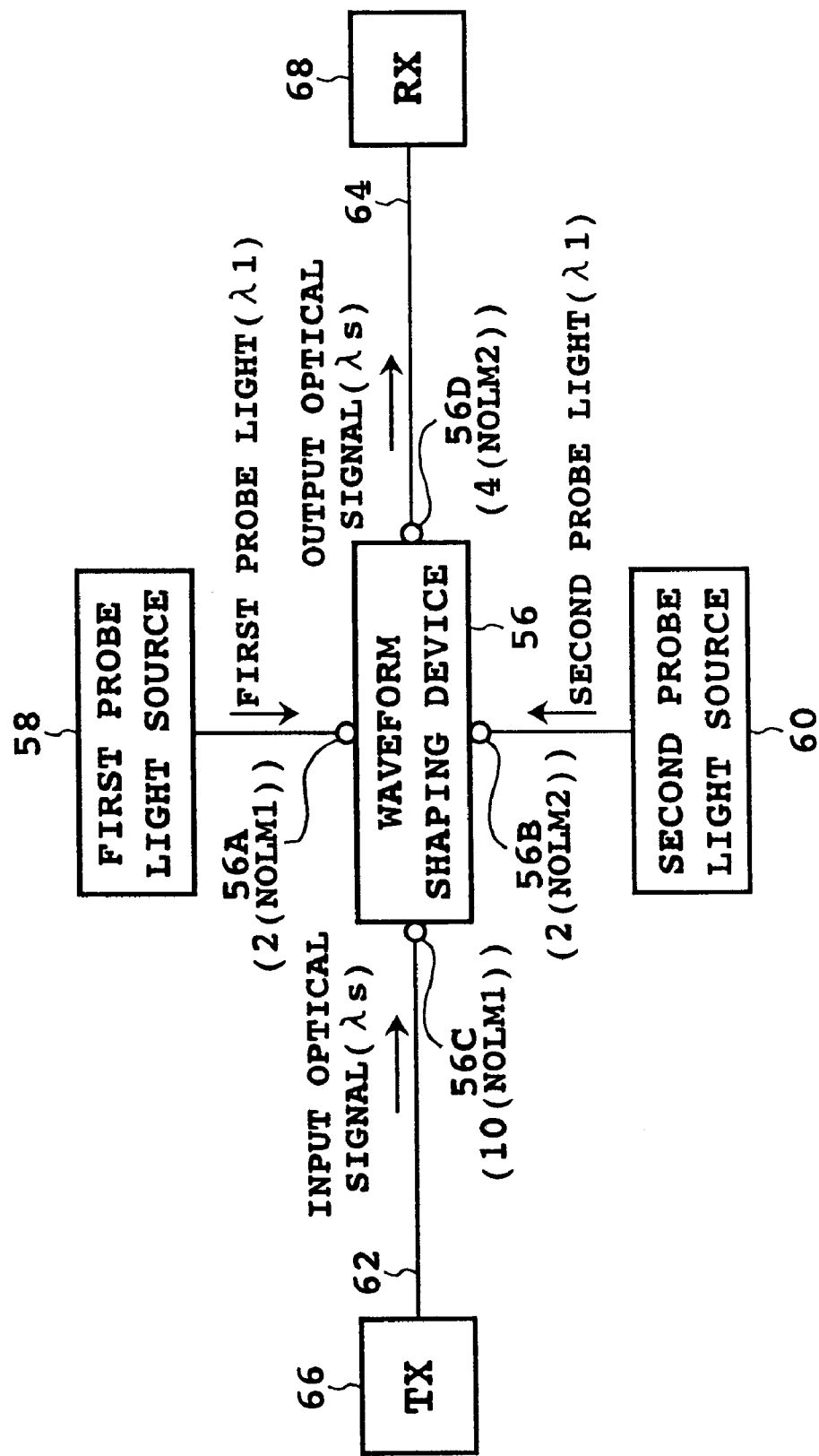
FIG. 9 is a block diagram showing a preferred embodiment of the system according to the present invention.

FIG. 9 is a block diagram showing a preferred embodiment of the system according to the present invention. This system has a waveform shaping device 56. The waveform shaping device 56 may be provided by any one of the above preferred embodiments of the device according to the present invention. The waveform shaping device 56 has an input port 56A (corresponding to the first optical path 2 of the NOLM1) for first probe light, an input port 56B (corresponding to the first optical path 2 of the NOLM2) for second probe light, an input port 56C (corresponding to the third optical path 10 of the NOLM1) for an input optical signal, and an output port 56D (corresponding to the second optical path 4 of the NOLM2) for an output optical signal.

A first probe light source 58 is connected to the input port 56A, and the first probe light (wavelength $\lambda_1$) output from the light source 58 is supplied to the waveform shaping device 56. A second probe light source 60 is connected to the input port 56B, and the second probe light (wavelength $\lambda_2$) output from the light source 60 is supplied to the waveform shaping device 56.

A first optical fiber transmission line 62 is connected to the input port 56C, and the input optical signal (wavelength $\lambda_s$) transmitted by the optical fiber transmission line 62 is supplied to the waveform shaping device 56. A second optical fiber transmission line 64 is connected to the output port 56D, and the output optical signal (wavelength $\lambda_2$) output from the waveform shaping device 56 is transmitted by the optical fiber transmission line 64.

An optical transmitter (TX) 66 for supplying the input optical signal to the optical fiber transmission line 62 is connected to an input end of the optical fiber transmission line 62, and an optical receiver (RX) 68 for receiving the output optical signal transmitted by the optical fiber transmission line 64 is connected to an output end of the optical fiber transmission line 64.

For example, optical amplitude (intensity) modulation is adopted as a modulation method for an optical signal in the optical transmitter 66. In this case, direct detection can be performed in the optical receiver 68, for example.

Each of the optical fiber transmission lines 62 and 64 may be provided by a single-mode silica fiber, a 1.3-μm zero-dispersion fiber, or a 1.55-μm dispersion shifted fiber, for example.

By configuring the HNL-DSF used as the nonlinear optical medium of each of the NOLM1 and the NOLM2 in the waveform shaping device 56 from a single-mode type and setting the mode field diameter of the HNL-DSF smaller than the mode field diameter of each of the optical fiber transmission lines 62 and 64, it is possible to obtain a nonlinear coefficient large enough to reduce the length of the HNL-DSF.

According to this system, the operation of waveform shaping according to the present invention is allowed in the waveform shaping device 56, and an output optical signal obtained by this operation with or without wavelength conversion can be transmitted by the second optical fiber transmission line 64.

Although not shown, one or more optical amplifiers may be arranged along an optical path including the optical fiber transmission lines 62 and 64. In the case that an erbium doped fiber amplifier (EDFA) is used as each optical amplifier, ASE noise is generated in each optical amplifier and it is accumulated along the optical path. Accordingly, in the system shown in FIG. 9, the SNR can be improved on the principle of waveform shaping or noise suppression in the waveform shaping device 56 as mentioned above.

While the waveform shaping device 56 is used as a repeater so as to be provided between the optical fiber transmission lines 62 and 64 in this preferred embodiment, the device according to the present invention may be provided inside or in the vicinity of the optical repeater 68, thereby allowing the improvement in receiver sensitivity.

Although not shown, the system shown in FIG. 9 may further include a dispersion compensator for compensating the dispersion of at least one of the optical fiber transmission lines 62 and 64. For example, the dispersion compensator provides a dispersion opposite in sign to the dispersion of each optical fiber transmission line. The absolute value of the dispersion of the dispersion compensator is adjusted so that the receiving condition in the optical receiver 68 becomes optimum. By using the dispersion compensator, the chromatic dispersion generated in each optical fiber transmission line can be suppressed to thereby allow long-haul transmission.

In each preferred embodiment of the device according to the present invention, each probe light may be CW light or optical pulses. For example, CW light may be used as the first probe light, and optical pulses synchronous with the input optical signal may be used as the second probe light. In the case that the optical pulses are clock pulses oscillating at the reference frequency of the input optical signal, the output optical signal is a signal subjected to retiming at this reference frequency. That is, by using this retiming function with the waveform shaping function, it is possible to perform 3R processing on the optical level. The term of "3R" means 2R mentioned above plus Retiming. In modifications, optical pulses may be used as the first probe light, and CW light may be used as the second probe light. Further, optical pulses may be used as both the first probe light and the second probe light.

Figure 10:
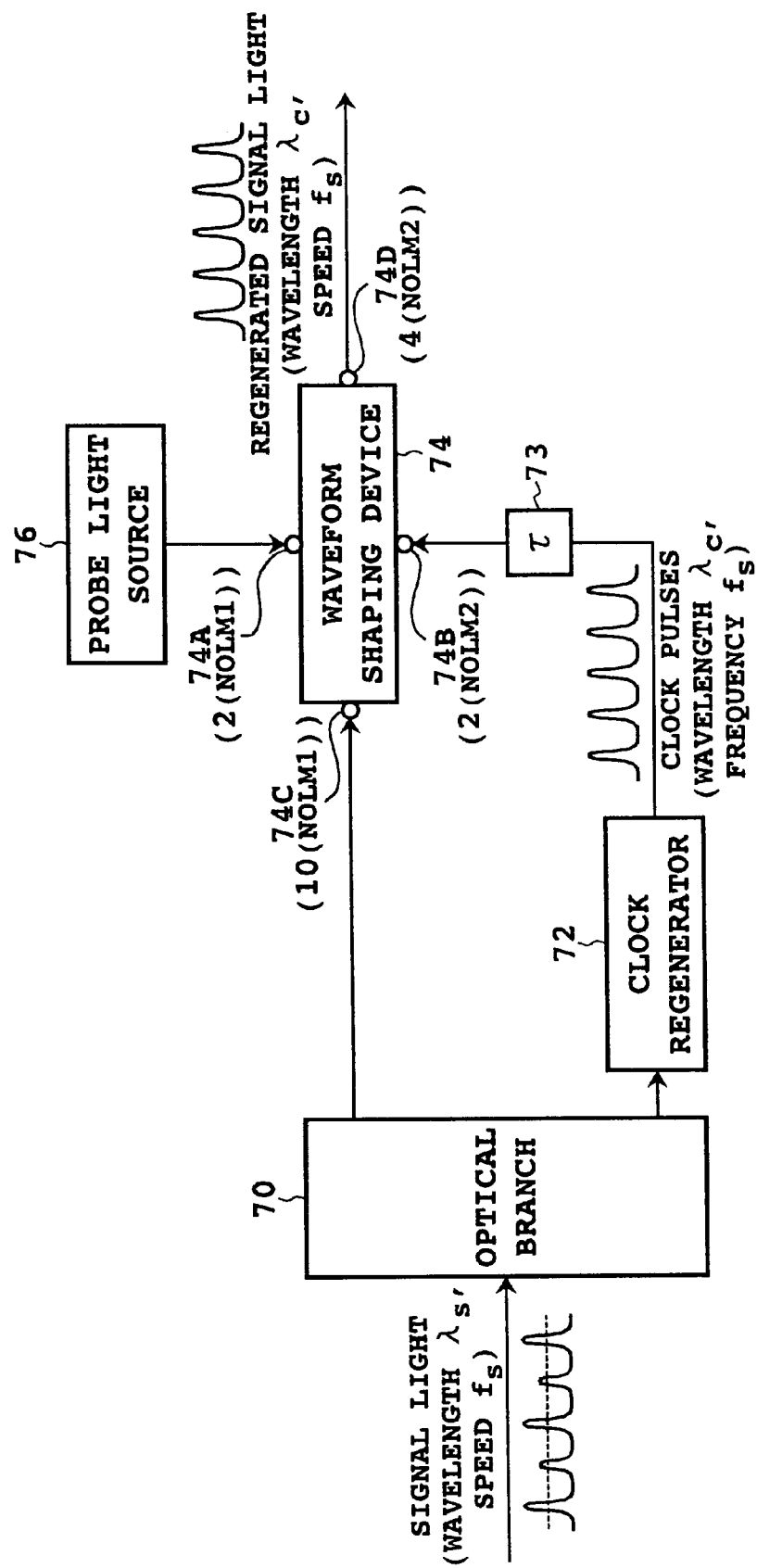
FIG. 10 is a block diagram showing a fourth preferred embodiment of the device according to the present invention.

FIG. 10 is a block diagram showing a fourth preferred embodiment of the device according to the present invention. This device includes an optical branch 70, clock regenerator 72, timing adjuster 73, waveform shaping device 74, and probe light source 76. Supplied to the optical branch 70 is signal light whose waveform has been distorted by dispersion or nonlinear optical effects during fiber transmission, signal light whose waveform has been perturbed by the accumulation of ASE noise in optical amplifiers during repeatered transmission using the optical amplifiers, or signal light involving the accumulation of jitter due to polarization dispersion or the like. The optical branch 70 branches the input signal light into first and second signal lights. The first and second signal lights are supplied to the clock regenerator 72 and the waveform shaping device 74, respectively. The clock regenerator 72 generates clock pulses according to the first signal light supplied. In this preferred embodiment, the input signal light has a wavelength $\lambda_s$ and a speed (bit rate) $f_s$, and the clock pulses have a wavelength $\lambda_c$ and a frequency $f_s$. The clock pulses generated from the clock regenerator 72 are adjusted in timing by the timing adjuster 73, and next supplied to the waveform shaping device 74.

The waveform shaping device 74 has an input port 74A for receiving probe light from the probe light source 76, an input port 74B for receiving the clock pulses from the clock regenerator 72, an input port 74C for receiving the second signal light from the optical branch 70, and an output port 74D. The waveform shaping device 74 performs waveform shaping according to the second signal light and the clock pulses supplied, and outputs regenerated signal light from the output port 74D. The regenerated signal light has the wavelength $\lambda_c$ and the speed $f_s$.

In this preferred embodiment, the port 74A corresponds to the first optical path 2 of the NOLM1, the port 74B corresponds to the first optical path 2 of the NOLM2, the port 74C corresponds to the third optical path 10 of the NOLM1, and the port 74D corresponds to the second optical path 4 of the NOLM2. Accordingly, the probe light supplied from the probe light source 76 is used as the first probe light, and the clock pulses are used as the second probe light. As a result, the wavelength of the regenerated signal light is equal to the wavelength of the clock pulses.

As a modification, the clock pulses may be input to the port 74A, and the probe light from the probe light source 76 may be input to the port 74B. In this case, the wavelength of the regenerated signal light is equal to the wavelength of the probe light supplied from the probe light source 76.

As another modification, the probe light source 76 may be omitted, and the clock pulses may be branched into first and second clock pulses. one of the first and second clock pulses may be subjected to wavelength conversion, and thereafter these first and second clock pulses may be input to the ports 74A and 74B, respectively.

Thus according to this preferred embodiment, waveform shaping is performed by using regenerated clock pulses, thereby allowing signal regeneration including timing regeneration on the optical level. Accordingly, it is possible to provide an all-optical 3R signal regenerating device according to this preferred embodiment by applying the present invention.

In the preferred embodiment shown in FIG. 10, the waveform shaping device 74 functions as an AND circuit for the signal having the speed $f_s$ and the clock pulses having the frequency $f_s$. By setting the frequency of the clock pulses to a value obtained by multiplying the signal speed by a fraction (e.g., in the case that the signal speed is 40 Gb/s, setting the frequency to 10 GHz), demultiplexing of an OTDM (optical time division multiplexed) signal can be performed, for example.

The clock regenerator 72 may be provided by a mode lock laser for sensing (pulling in) a frequency component contained in signal light and generating clock pulses having a reference frequency from the frequency component. Alternatively, signal light having a wavelength $\lambda_s$ and a speed $f_s$ may be input into a laser continuously oscillating at a wavelength $\lambda_c$, and an optical modulator included in this laser may be subjected to amplitude modulation or frequency modulation by the signal light. Then, the optical path length of the laser may be adjusted so that the modulation frequency corresponds to the resonance period of the laser, thereby generating clock pulses having a wavelength $\lambda_c$ and a frequency $f_s$.

Figure 11:
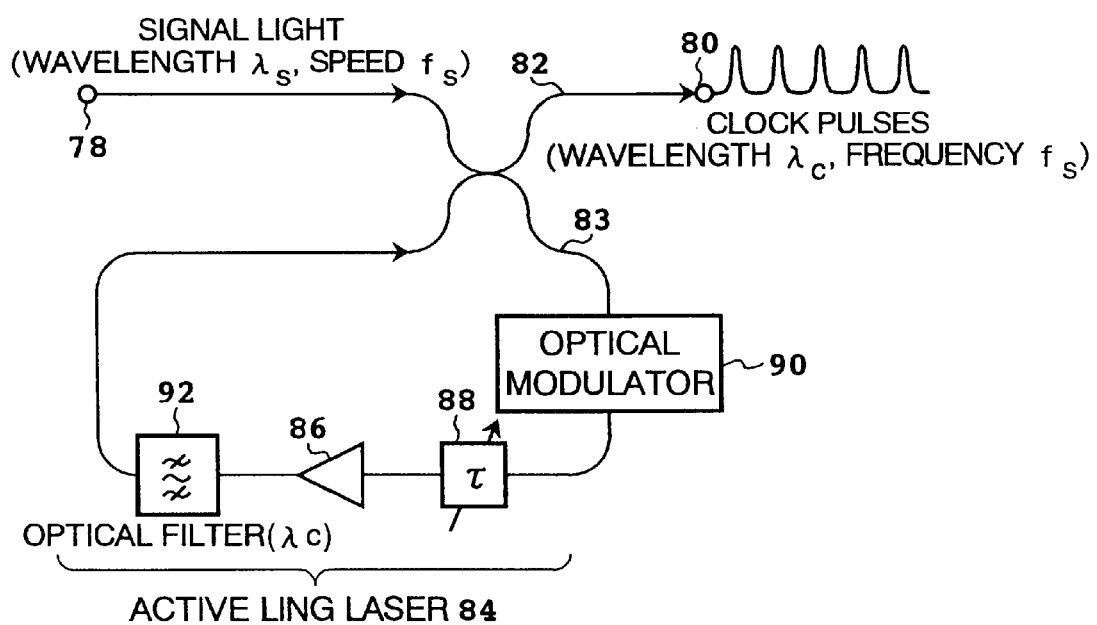
FIG. 11 is a block diagram showing a preferred embodiment of a clock regenerator.

FIG. 11 is a block diagram showing a preferred embodiment of the clock regenerator. This clock regenerator includes an optical path 82 provided between an input port 78 and an output port 80, and an active ring laser 84 including an optical loop 83 optically coupled (e.g., directionally coupled) to the optical path 82.

Signal light having a wavelength $\lambda_s$ and a speed $f_s$ is supplied to the input port 78. The active ring laser 84 includes an optical amplifier 86 for compensating loss in the optical loop 83 so that laser oscillation occurs in the optical loop 83, an adjuster 88 for adjusting the optical path length of the optical loop 83 so that the speed (or frequency) $f_s$ becomes equal to an integral multiple of the reciprocal of a recirculation period of the optical loop 83, and an optical modulator (or nonlinear optical medium) 90 for mode-locking the laser oscillator according to the signal light. The active ring laser 84 may further include an optical bandpass filter 92 having a pass band including the wavelength $\lambda_c$ of the laser oscillation.

With this configuration, the laser oscillation of the active ring laser 84 is mode-locked, so that clock pulses having the wavelength $\lambda_c$ and the frequency $f_s$ are generated and output from the output port 80. Accordingly, clock pulses can be obtained without the need for opto/electric conversion, and it is possible to provide an all-optical clock regenerator insensitive to the speed and pulse shape of signal light.

The optical modulator 90 may be provided by an electro/optic modulator such as a LiNbO$_3$ intensity modulator and an EA (electroabsorption) modulator. Alternatively, a modulation method using second-order or third-order nonlinear optical effects or cross gain modulation may be adopted. For example, in the case of using four-wave mixing in an optical fiber, the wavelength $\lambda_s$ of signal light is set to a wavelength near the zero-dispersion wavelength of the fiber to effectively amplitude-modulate continuously oscillated light, thereby generating clock pulses. In the case of using a semiconductor optical amplifier (SOA), signal light can be used as pump light. In the case of using four-wave mixing in a DFB-LD in its oscillating state, the wavelength of signal light is set to a wavelength different from the wavelength of oscillated light in the DFB-LD, and this signal light is input with a relatively high power to induce gain saturation, thereby modulating the efficiency of four-wave mixing. Further, the continuously oscillated light can be effectively amplitude-modulated by a cross gain modulation (XGM) effect. This effect of XGM is exhibited also in the case of using four-wave mixing in an BOA, so that XGM may be positively used.

Also in the case of using second-order nonlinear optical effects, substantially the same effect can be obtained by using signal light as pump light. On the other hand, in the case of using cross phase modulation (XPM), amplitude modulation can be generated by using polarization fluctuations due to phase modulation, for example.

Like the waveform shaping device 56 shown in FIG. 9, the device shown in FIG. 10 may be used as an all-optical 2R regenerative repeater or 3R regenerative repeater arranged along a transmission line, or may be used to improve a receiver sensitivity at a receiving end. In any case, high-quality transmission is allowed by combining this device with a repeating optical amplifier or an optical preamplifier. Further, in the case that the waveform of signal light is distorted by the dispersion or nonlinear optical effects in an optical fiber transmission line, it is effective to compensate the waveform by using a dispersion compensator or a nonlinear compensator (e.g., phase conjugator) and thereafter perform the waveform shaping or noise elimination in accordance with the present invention.

While a plurality of NOLMs are cascaded in each preferred embodiment mentioned above, a plurality of interferometers based on the operating principle similar to that of the NOLMs may be cascaded.

Each interferometer may be provided by an SOA-MZI or SOA-MI, for example.

According to the present invention as described above, it is possible to provide a device for waveform shaping which can increase the degree of freedom of wavelength conversion. It is also possible to provide a novel system including such a device.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A device comprising N (N is an integer greater than 2) nonlinear loop mirrors cascaded, each of said nonlinear loop mirrors comprising:
   a first optical coupler including first and second optical paths directionally coupled to each other;
   a loop optical path formed of a nonlinear optical medium for connecting said first and second optical paths; and
   a second optical coupler including a third optical path directionally coupled to said loop optical path;
   said second optical path of said i-th (i is an integer satisfying $1 \leq i \leq (N-1)$) nonlinear loop mirror being optically connected to said third optical path of said (i+1)-th nonlinear loop mirror.

2. A device comprising first and second nonlinear loop mirrors, each of said first and second nonlinear loop mirrors comprising:
   a first optical coupler including first and second optical paths diredtionally coupled to each other;
   a loop optical path formed of a nonlinear optical medium for connecting said first and second optical paths; and
   a second optical coupler including a third optical path directionally coupled to said loop optical path;
   said second optical path of said first nonlinear loop mirror being optically connected to said third optical path of said second nonlinear loop mirror, wherein:
   first probe light having a first wavelength is supplied to said first optical path of said first nonlinear loop mirror;
   an input optical signal having a second wavelength different from said first wavelength is supplied to said third optical path of said first nonlinear loop mirror;
   an intermediate optical signal having said first wavelength and synchronous with said input optical signal is supplied from said second optical path of said first nonlinear loop mirror to said third optical path of said second nonlinear loop mirror;
   second probe light having a third wavelength different from said first wavelength is supplied to said first optical path of said second nonlinear loop mirror; and
   an output optical signal having said third wavelength and synchronous with said intermediate optical signal is output from said second optical path of said second nonlinear loop mirror.

3. A device according to claim 2, wherein the sign of the difference between said first wavelength and said second wavelength is equal to the sign of the difference between said third wavelength and said first wavelength.

4. A device according to claim 2, wherein said third wavelength is substantially equal to said second wavelength.

5. A device according to claim 2, wherein at least one of said first and second probe lights comprises clock pulses.

6. A device according to claim 2, wherein said loop optical path of each of said first and second nonlinear loop mirrors is provided by an optical fiber.

7. A device according to claim 6, wherein said optical fiber comprises a core doped with $GeO_2$ and a cladding doped with fluorine.

8. A device according to claim 6, wherein:
   said optical fiber of said first nonlinear loop mirror has a zero-dispersion wavelength substantially intermediate between said first wavelength and said second wavelength; and
   said optical fiber of said second nonlinear loop mirror has a zero-dispersion wavelength substantially intermediate between said first wavelength and said third wavelength.

9. A device according to claim 6, wherein:
   said first and second wavelengths fall in any one of a normal dispersive region and an anomalous dispersive region of said optical fiber of said first nonlinear loop mirror; and
   said first and third wavelengths fall in any one of a normal dispersive region and an anomalous dispersive region of said optical fiber of said second nonlinear loop mirror.

10. A device according to claim 6, wherein said optical fiber comprises a polarization maintaining fiber.

11. A device according to claim 6, wherein:
    said optical fiber comprises first and second polarization maintaining fibers having substantially the same length;
    said first and second polarization maintaining fibers being connected together so that their principal axes are orthogonal to each other.

12. A device according to claim 6, further comprising:
    a first optical bandpass filter optically connected to said second optical path of said first nonlinear loop mirror and having a pass band including said first wavelength; and
    a second optical bandpass filter optically connected to said second optical path of said second nonlinear loop mirror and having a pass band including said third wavelength.

13. A device according to claim 6, further comprising:
    a first optical bandstop filter optically connected to said second optical path of said first nonlinear loop mirror and having a stop band including said second wavelength; and
    a second optical bandstop filter optically connected to said second optical path of said second nonlinear loop mirror and having a stop band including said first wavelength.

14. A device according to claim 6, further comprising:
    a first optical bandpass filter optically connected to said third optical path of said first nonlinear loop mirror and having a pass band including said second wavelength; and
    a second optical bandpass filter optically connected to said third optical path of said second nonlinear loop mirror and having a pass band including said first wavelength.

15. A device according to claim 6, further comprising:
    a first optical bandstop filter optically connected to said third optical path of said first nonlinear loop mirror and having a stop band including said first wavelength; and
    a second optical bandstop filter optically connected to said third optical path of said second nonlinear loop mirror and having a stop band including said third wavelength.

16. A device according to claim 6, further comprising:
    a first power monitor optically connected to said second optical path of said first nonlinear loop mirror for detecting the power of said intermediate optical signal;
    a first power controller for controlling the power of at least one of said input optical signal and said first probe light so that the power detected by said first power monitor is increased;
    a second power monitor optically connected to said second optical path of said second nonlinear loop mirror for detecting the power of said output optical signal; and
    a second power controller for controlling the power of at least one of said intermediate optical signal and said second probe light so that the power detected by said second power monitor is increased.

17. A device according to claim 6, further comprising:
    a first power monitor optically connected to said first optical path of said first nonlinear loop mirror for detecting the power of light having said first wavelength output in a direction opposite to the propagation direction of said first probe light;

a first power controller for controlling the power of at least one of said input optical signal and said first probe light so that the power detected by said first power monitor is decreased;

a second power monitor optically connected to said first optical path of said second nonlinear loop mirror for detecting the power of light having said third wavelength output in a direction opposite to the propagation direction of said second probe light; and a second power controller for controlling the power of at least one of said intermediate optical signal and said second probe light so that the power detected by said second power monitor is decreased.

18. A device comprising first and second nonlinear loop mirrors, each of said first and second nonlinear loop mirrors comprising:

a first optical coupler including first and second optical paths directionally coupled to each other;

a loop optical path formed of a nonlinear optical medium for connecting said first and second optical paths; and a second optical coupler including a third optical path directionally coupled to said loop optical path;

said second optical path of said first nonlinear loop mirror being optically connected to said third optical path of said second nonlinear loop mirror.

19. A device according to claim 18, further comprising at least one third nonlinear loop mirror optically connected to said second optical path of said second nonlinear loop mirror.

20. A system comprising:

a waveform shaping device comprising first and second nonlinear loop mirrors each of said first and second nonlinear loop mirrors comprising a first optical coupler including first and second optical paths directionally coupled to each other, a loop optical path formed of a nonlinear optical medium for connecting said first and second optical paths, and a second optical coupler including a third optical path directionally coupled to said loop optical path, said second optical path of said first nonlinear loop mirror being optically connected to said third optical path of said second nonlinear loop mirror;

a first probe light source for supplying first probe light having a first wavelength to said first optical path of said first nonlinear loop mirror;

a first optical fiber transmission line for supplying an input optical signal having a second wavelength different from said first wavelength to said third optical path of said first nonlinear loop mirror; and a second probe light source for supplying second probe light having a third wavelength different from said first wavelength to said first optical path of said second nonlinear loop mirror;

an intermediate optical signal having said first wavelength and synchronous with said input optical signal being supplied from said second optical path of said first nonlinear loop mirror to said third optical path of said second nonlinear loop mirror;

an output optical signal having said third wavelength and synchronous with said intermediate optical signal being output from said second optical path of said second nonlinear loop mirror.

21. A system according to claim 20, further comprising a second optical fiber transmission line optically connected to said second optical path of said second nonlinear loop mirror for transmitting said output optical signal.

22. A device comprising:

an optical branch for branching input signal light into first and second input signal lights;

a clock regenerator for generating clock pulses according to said first input signal light; and a waveform shaping device for performing waveform shaping according to said second input signal light and said clock pulses, said waveform shaping device comprising first and second nonlinear loop mirrors, each of said first and second nonlinear loop mirrors comprising a first optical coupler including first and second optical paths directionally coupled to each other, a loop optical path formed of a nonlinear optical medium for connecting said first and second optical paths, and a second optical coupler including a third optical path directionally coupled to said loop optical path, said second optical path of said first nonlinear loop mirror being optically connected to said third optical path of said second nonlinear loop mirror;

said second input signal light being supplied to said third optical path of said first nonlinear loop mirror;

said clock pulses being supplied to at least one of said first optical path of said first nonlinear loop mirror and said first optical path of said second nonlinear loop mirror.

23. A device according to claim 22, wherein:

said clock pulses are supplied to one of said first optical path of said first nonlinear loop mirror and said first optical path of said second nonlinear loop mirror; and said device further comprises a probe light source for supplying probe light to the other of said first optical path of said first nonlinear loop mirror and said first optical path of said second nonlinear loop mirror.

* * * * *

UNITED STATES PATENT AND TRADEMARK OFFICE
CERTIFICATE OF CORRECTION

PATENT NO. : 6,453,082 B1
DATED : September 17, 2002
INVENTOR(S) : Shigeki Watanabe It is certified that error appears in the above-identified patent and that said Letters Patent is hereby corrected as shown below:

Column 21,
Line 33, after "mirrors" insert -- , --.

Signed and Sealed this

Twenty-fifth Day of February, 2003

JAMES E. ROGAN
*Director of the United States Patent and Trademark Office*